US008151195B2

(12) United States Patent
Shenoy

(10) Patent No.: US 8,151,195 B2
(45) Date of Patent: Apr. 3, 2012

(54) TITLE EDITING FOR SLOW OR FAST MOTION ON RECORDABLE DVD DISCS

(75) Inventor: Nagesh Shenoy, Bangalore (IN)

(73) Assignee: LSI Corporation, Milpitas, CA (US)

( * ) Notice: Subject to any disclaimer, the term of this patent is extended or adjusted under 35 U.S.C. 154(b) by 945 days.

(21) Appl. No.: 12/049,457

(22) Filed: Mar. 17, 2008

(65) Prior Publication Data

US 2009/0228797 A1    Sep. 10, 2009

Related U.S. Application Data

(60) Provisional application No. 61/033,860, filed on Mar. 5, 2008.

(51) Int. Cl.
*G06F 15/00* (2006.01)
*G06F 13/00* (2006.01)

(52) U.S. Cl. ...................... 715/723; 715/730

(58) Field of Classification Search .................. 715/730, 715/741, 726, 729, 763–765, 771, 711–716, 715/851–853; 386/125, 52
See application file for complete search history.

(56) References Cited

U.S. PATENT DOCUMENTS

| 6,856,755 | B1 | 2/2005 | Lin et al. ............... 386/52 |
| 6,965,729 | B1* | 11/2005 | De Haan ............... 386/241 |
| 6,990,288 | B2 | 1/2006 | Kikuchi et al. ............ 386/95 |
| 2007/0143678 | A1* | 6/2007 | Feigenbaum ............ 715/704 |
| 2009/0074377 | A1* | 3/2009 | Herz ...................... 386/69 |

\* cited by examiner

*Primary Examiner* — Kevin Nguyen
(74) *Attorney, Agent, or Firm* — Christopher P. Maiorana, PC

(57) ABSTRACT

A method for editing a title recorded on a digital storage medium. The method includes the steps of (A) defining a portion of the title to be edited for slow or fast motion playback, (B) modifying at least one address of presentation control information (PCI) for the title based upon a user editing command and (C) controlling playback of the title in accordance with the modified PCI to carry out the user editing command.

20 Claims, 6 Drawing Sheets

| SYMBOL | CONTENTS |
|---|---|
| PCI_GI | PCI GENERAL INFORMATION |
| NSML_AGLI | NONSEAMLESS ANGLE INFORMATION |
| HLI | HIGHLIGHT INFORMATION |
| RECI | RECORDING INFORMATION |

FIG. 3

| SYMBOL | CONTENTS |
|---|---|
| NV_PCK_LBN | LOGICAL BLOCK NUMBER OF NAVIGATION PACK |
| VOBU_CAT | CATEGORY OF VOBU |
| RESERVED | RESERVED |
| VOBU_UOP_CTL | USER OPERATION CONTROL OF VOBU |
| VOBU_S_PTM | START PTM OF VOBU |
| VOBU_E_PTM | END PTM OF VOBU |
| VOBU_SE_E_PTM | END PTM OF SEQUENCE END IN VOBU |
| C_ELTM | CELL ELAPSE TIME |
| PCI_GI_EXT | PCI_GI EXTENSION INFORMATION |

FIG. 4

| RESERVED | RESERVED |
|---|---|
| PCI_GI_XI | PCI_GI EXTENSION INFORMATION |
| RT_ATR_1 | REAL-TIME ATTRIBUTE |
| RT_ATR_2 | REAL-TIME ATTRIBUTE |
| RT_ATR_3 | REAL-TIME ATTRIBUTE |
| RESERVED | RESERVED |

| BIT 7 | BIT 6 | BIT 5 | BIT 4 | BIT 3 | BIT 2 | BIT 1 | BIT 0 |
|---|---|---|---|---|---|---|---|
| RES. | RES. | FWD 32 | FWD 16 | FWD 8 | FWD 4 | FWD 2 | FWD 1 |
| RES. | RES. | FWD 1/32 | FWD 1/16 | FWD 1/8 | FWD 1/4 | FWD 1/2 | FWD 1 |

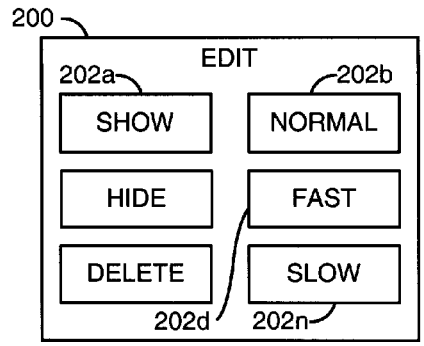
FIG. 7A
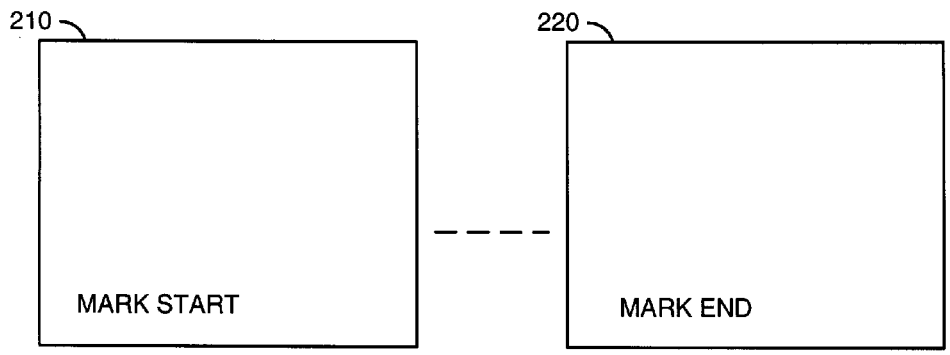
FIG. 7B
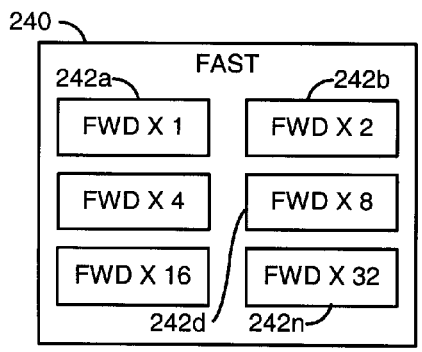 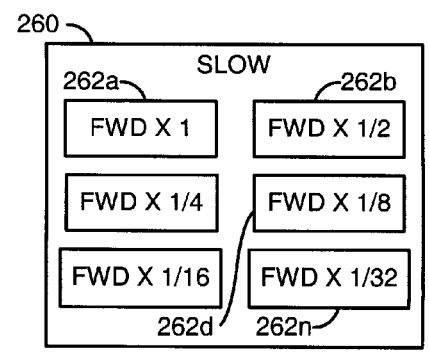
FIG. 7C  FIG. 7D

TITLE EDITING FOR SLOW OR FAST MOTION ON RECORDABLE DVD DISCS

This application claims the benefit of U.S. Provisional Application No. 61/033,860, filed Mar. 5, 2008 and is hereby incorporated by reference in its entirety.

FIELD OF THE INVENTION

The present invention relates to digital video recording generally and, more particularly, to a method and/or apparatus for title editing for slow or fast motion on recordable DVD discs.

BACKGROUND OF THE INVENTION

Conventional recordable DVD specifications limit the editing capabilities of a user. When editing a movie (or title) shot by the user (e.g., from a vacation trip), the user is limited to marking specific positions on the title that identify a specific chapter/portion of a recording, showing/hiding the specific chapter/portion of the recording, or deleting the specific chapter/portion of the recording.

It would be desirable to allow a user to mark a chapter/portion, such that the chapter/portion may be played back using slow or fast motion.

SUMMARY OF THE INVENTION

The present invention concerns a method for editing a title recorded on a digital storage medium. The method includes the steps of (A) defining a portion of the title to be edited for slow or fast motion playback, (B) modifying at least one address of presentation control information (PCI) for the title based upon a user editing command and (C) controlling playback of the title in accordance with the modified PCI to carry out the user editing command.

The objects, features and advantages of the present invention include providing a method and/or apparatus for title editing for slow or fast motion on recordable DVD discs that may (i) allow a user, as part of editing, to select a playback mode, (ii) allow certain portions of a title to be played in slow motion or fast motion, (iii) provide additional product level feature, and/or (iv) enhance the user experience with movie-like editing features.

BRIEF DESCRIPTION OF THE DRAWINGS

These and other objects, features and advantages of the present invention will be apparent from the following detailed description and the appended claims and drawings in which:

FIG. 3 is a diagram illustrating an example of contents of a presentation control information (PCI) data portion of FIG. 2;

FIG. 4 is a diagram illustrating example of contents of a presentation control information general information (PCI_GI) portion of FIG. 3;

FIGS. 7(A-D) are diagrams illustrating an editing feature in accordance with an embodiment of the present invention;

DETAILED DESCRIPTION OF THE PREFERRED EMBODIMENTS

Figure 1:
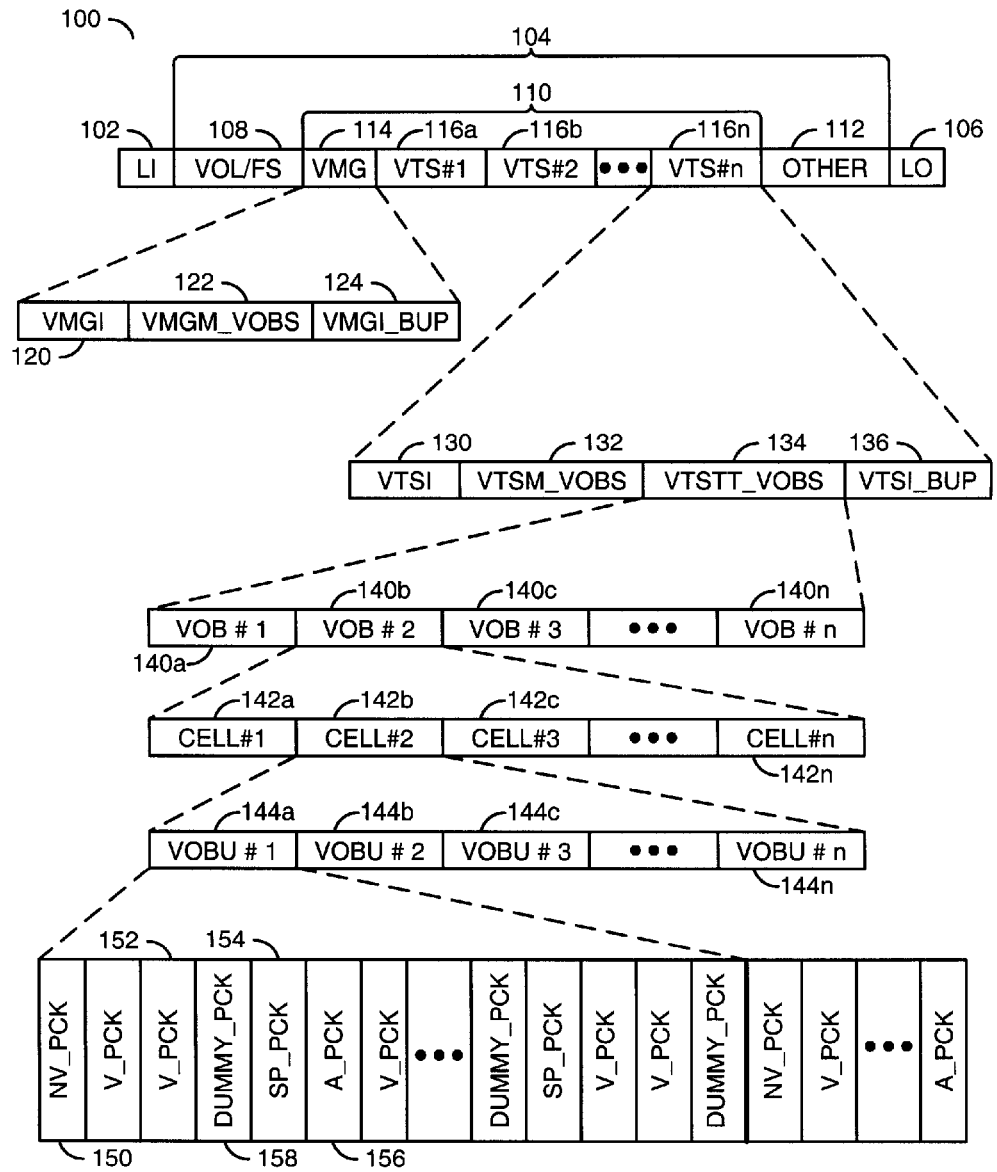
FIG. 1 is a diagram illustrating an example of a logical structure of information recorded on an optical disc.

Referring to FIG. 1, a diagram is shown illustrating a logical structure (or architecture) 100 for organizing information recorded on an optical disc. In one example, the optical disc may be implemented as a rewritable (e.g., DVD-RAM/DVD-RW/DVD+RW) or a write once (e.g., DVD-R, DVD+R) disc. However, other disc formats may be implemented as well (e.g., DVD-VR, DVD+VR, etc.). In one example, the structure 100 may include, but is not limited to, a lead-in (LI) area 102, an information area 104 and a lead-out (LO) area 106. The information area 104 may comprise data stored on one or more recording tracks (e.g., lands/grooves) of the optical disc. In one example, a recording track may be continuously formed in, for example, a spiral pattern. The continuous recording track may be divided in one example, into a plurality of physical sectors. The physical sectors may have serial numbers and may be used as recording units. In another example, the data recording track may be divided into a plurality of logical sectors (e.g., minimum recording units) each having a predetermined storage capacity. Data may be recorded with reference to the logical sectors. The recording capacity per logical sector may, in one example, be equal to a length of one data pack. In one example, the capacity per logical sector may be determined to be 2,048 bytes.

In one example, the information area 104 may have a structure compliant with the Universal Disc Format (UDF) Bridge (a hybrid of UDF and ISO9660) as one of a number of standard formats. However, other standard or proprietary formats may be implemented accordingly to meet the design criteria of a particular implementation. In one example, the information area 104 may be implemented as a volume space. The information area 104 may have a hierarchical structure comprising, in one example, a portion 108, a portion 110 and a portion 112. The portion 108 may be implemented as a volume/file structure (VOL/FS) area. The volume/file structure (VOL/FS) 108 may contain information of the volume and file structures. The volume/file structure area 108 may be implemented as a management area compliant with the UDF Bridge standard. The portion 110 may comprise a DVD video area for applications compatible with one or more DVD specifications. The portion 112 may comprise a recording area for applications compatible with specifications other than the DVD specifications.

The DVD video area 110 may comprise a video manager (VMG) area 114 and one or more video title sets (VTS#n) 116a-116n. Based on the description of the volume/file structure (VOL/FS) area 108, the contents of video manager (VMG) area 114 may be stored in an internal system memory of a playback device (not shown). The one or more video title sets (VTS#n) 116a-116n may be split up on the boundaries of logical sectors. When one logical sector is defined to be 2,048 bytes, and one logical block is also defined to be 2,048 bytes, one logical sector is defined equivalently with one logical block. In one example, the DVD video area 110 may be implemented as a file comprising the one or more video title sets (VTSs) 116a-116n and the video manager (VMG) 114 for managing the VTSs. In one example, the video manager (VMG) 114 may comprise video manager information (e.g., VMGI) area 120, a video object set for manager menus (e.g., VMGM_VOBS) area 122, and/or a backup file of the VMGI (e.g., VMGI_BUP) 124.

Each of the video title sets (VTSs) 116a-116n may be implemented as a file comprising one or more of a video title set information (e.g., VTSI) portion 130, a video object set for video title set menus (e.g., VTSM_VOBS) portion 132, a video object set for video title set titles (e.g., VTSTT_VOBS) portion 134 and/or a backup file of the VTSI portion (e.g., VTSI_BUP) 136. The video title set information (VTSI) portion may be implemented for managing the VTSTT_VOBS portion 134. The other recording area 112 may record information that may be used in the VTSs 116a-116n or other types of information that is irrelevant to VTSs 116a-116n.

The VTSTT_VOBS portion 134 of each VTS 116 generally defines a set of one or more video objects (VOB) 140a-140n. Each of the video objects (VOB) 140a-140n generally defines a set of one or more cells 142a-142n. A set of one or more cells may make up a program chain (PGC). In one example, one PGC may correspond to one movie. A plurality of cells making up the PGC may correspond to various scenes in the movie. Each of the cells 142a-142n may comprise a set of one or more video object units (VOBUs) 144a-144n. Each of the VOBUs 144a-144n may comprise a set of various types of data packs. In one example, the various types of data packs may include, but are not limited to, a navigation pack (NV_PCK) 150, a video pack (V_PCK) 152, a sub-picture pack (SP_PCK) 154, an audio pack (A_PCK) 156 and a dummy pack (DUMMY_PCK) 158. One or more of the dummy packs 158 may be inserted in each VOBU to allow recording of data added during editing performed after a video title is initially recorded. In one example, each of the data packs 150 to 158 may serve as a minimum unit of data transfer.

The playback time of a VOBU 144 generally corresponds to that of video data made up of one or more picture groups (e.g., groups of pictures (GOP) in MPEG), and is generally set to fall within the range from 0.4 sec to 1.2 sec. One GOP generally comprises screen data that normally has a playback time of about 0.5 sec in the MPEG format, and is compressed to play back approximately 15 images during the respective interval. In general, playback data comprising audio data and/or sub-picture data alone may be formed using a VOBU as one unit.

Figure 2:
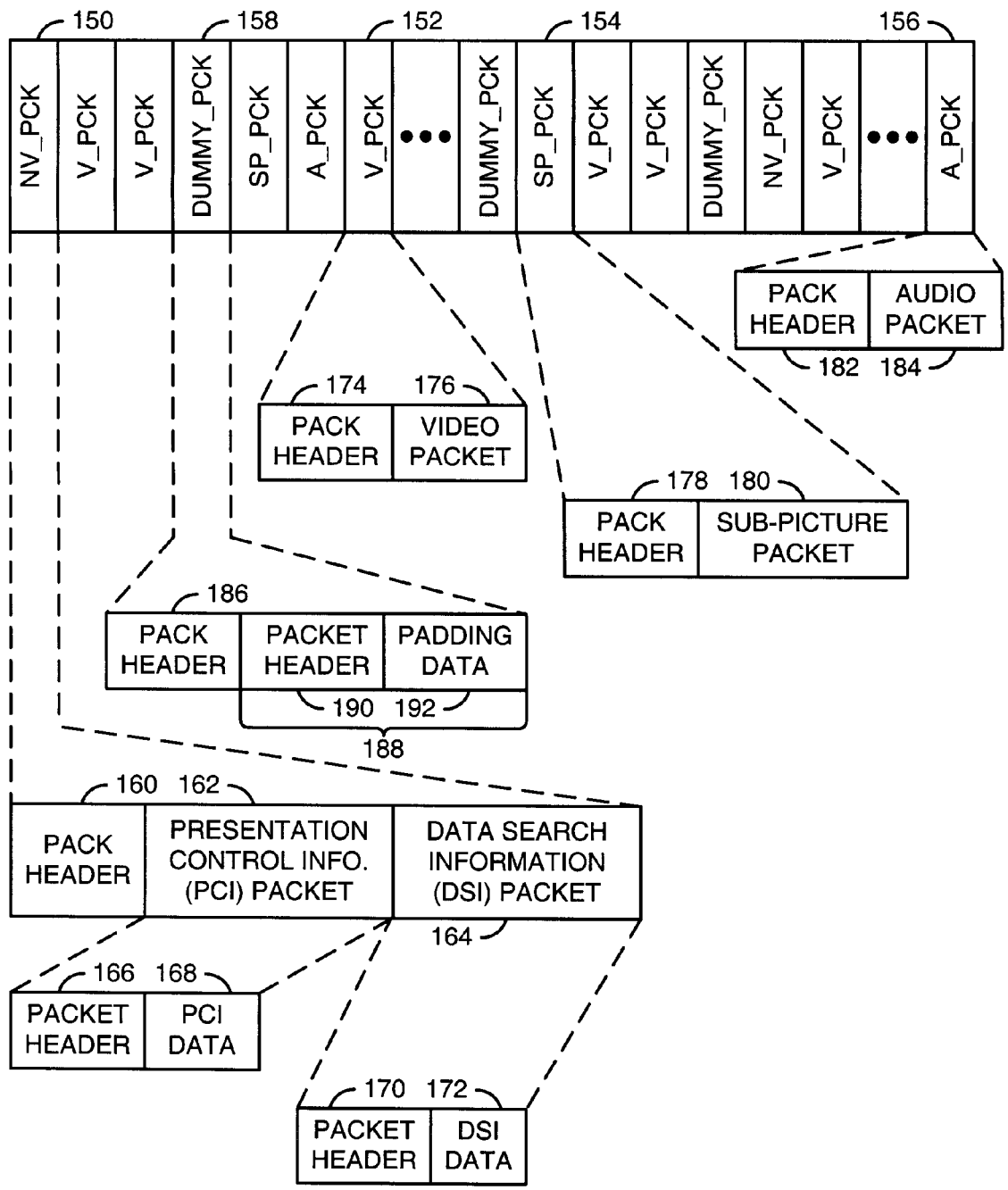
FIG. 2 is a diagram illustrating an example of contents organized as packs in the lowermost layer of the hierarchical structure shown in FIG. 1.

Referring to FIG. 2, a diagram is shown illustrating example contents of various types of packs in the lowermost layer of the hierarchical structure 100 of FIG. 1. In one example, a pack sequence may include a navigation pack 150, video packs 152, a dummy pack 158, a sub-picture pack 154, an audio pack 156, etcetera. The navigation pack 150 may comprise a pack header 160, a playback control information/presentation control information (PCI) packet 162, and a data search information (DSI) packet 164. The PCI packet 162 may comprise a packet header 166 and PCI data 168. The DSI packet 164 may comprise a packet header 170 and DSI data 172.

The PCI packet 162 generally contains control data used, for example, upon non-seamlessly switching of the playback angles. The DSI packet 164 generally contains control data used, for example, upon seamlessly switching of the playback angles. The term "angle switching" generally refers to changes in angle (camera angle) in which an object picture is viewed (or presented). The video packs 152 may comprise a pack header 174 and a video packet 176. The sub-picture packs 154 may comprise a pack header 178 and a sub-picture packet 180. The audio packs 156 may comprise a pack header 182 and an audio packet 184. The dummy packs 158 may comprise a pack header 186 and a padding packet 188. The padding packet 188 may comprise a packet header 190 and padding data 192. In general, the padding data 192 stores insignificant data. The video packet 176 may include a packet header (not shown), which records a decode time stamp (DTS) and presentation time stamp (PTS). Each of the sub-picture packets 180 and the audio packets 184 may also contain a packet header (not shown), which records a presentation time stamp (PTS).

Referring to FIG. 3, a diagram is shown illustrating example contents of the presentation control information (PCI) data 168 of FIG. 2. In one example, the PCI data may comprise PCI general information (e.g., PCI_GI), non-seamless playback angle information (e.g., NSML_AGLI), highlight information (e.g., HLI), and recording information (e.g., RECI). In one example, the presentation control information (PCI) data 168 may be modified in accordance with the present invention to allow slow or fast motion playback of all or a portion of a recorded title. In one example, the title (e.g., a vacation movie, etc.) may be recorded at normal (e.g., one times forward) speed. Subsequently, the title may be edited to change the speed at which one or more selected portions of the title are played back. An editing process in accordance with an embodiment of the present invention may store (or modify) information regarding playback speed for one or more portions of the title within the PCI general information PCI_GI.

Referring to FIG. 4, a diagram is shown illustrating example contents of the presentation control information general information (PCI_GI) portion of FIG. 3. The presentation control information general information PCI_GI portion of the PCI data may comprise, in one example, a field containing a logical block number (e.g., NV_PCK_LBN) of a navigation pack, a field containing a category (e.g., VOBU_CAT) of the respective VOBU, a field containing user operation control (e.g., VOBU_UOP_CTL) information of the respective VOBU, a field containing a presentation start time (e.g., VOBU_S_PTM) of the respective VOBU, a field containing a presentation end time (e.g., VOBU_E_PTM) of the respective VOBU, a field containing a presentation end time (e.g., VOBU_SE_PTM) of the sequence end in the respective VOBU, a field containing a cell elapse time (e.g., C_ELTM) and/or a field containing PCI_GI extension information (e.g., PCI_GI_EXT). The logical block number NV_PCK_LBN generally represents an address (or recording location) of a navigation pack including the presentation control information (PCI) by the relative number of blocks from the first logical block in the video object set (VOBS) containing the respective PCI.

The field VOBU_CAT may describe, in one example, the contents of copy protection of an analog signal corresponding to video and sub-picture data in the respective VOBU that includes the presentation control information (PCI). The field VOBU_UOP_CTL may describe user operations that are prohibited during the display (or presentation) period of the VOBU that includes the presentation control information (PCI). The field VOBU_S_PTM may describe the start time of display (or presentation) of the VOBU that includes the presentation control information (PCI). More specifically, the parameter VOBU_S_PTM may indicate the start display time of the first video (e.g., first picture) in the display order of the first GOP in the respective VOBU.

The parameter VOBU_E_PTM may describe the end time of display (or presentation) of the VOBU that includes the presentation control information (PCI). More specifically, the information in the field VOBU_E_PTM may indicate the end display time of the last video (e.g., last picture) in the display order of the last GOP in the respective VOBU. When no video data is present in the respective VOBU, or when playback of the respective VOBU is stopped, the parameter VOBU_E_PTM may indicate the end time of virtual video data aligned to time grids of field intervals (e.g., 1/60 sec in the case of NTSC video).

The information in the field VOBU_SE_PTM may describe the end time of display (or presentation) based on a sequence end code in the video data in the VOBU that includes the presentation control information (PCI). More specifically, the end time VOBU_SE_PTM may indicate the end display time of the last video (e.g., last picture) in the display order, which picture includes the sequence end code, in the respective VOBU. When no video (or picture) with a sequence end code is present in the VOBU, the parameter VOBU_SE_PTM may be set to 00000000h, where h is an abbreviation for hexadecimal.

The parameter C_ELTM may describe the relative display (or presentation) time from the first video frame in the display order of a cell that includes the presentation control information (PCI) to the first video frame in the display order of the VOBU that includes the PCI. In one example, the display time may be expressed in hours, minutes, and seconds in the BCD format and frames. When no video data is present in the respective VOBU, the first video frame of the virtual video data may be used as the video frame.

The field PCI_GI_EXT may be implemented containing PCI_GI extension information. In one example, the field PCI_GI_EXT may contain DVD+RW Video specific information. In another example, the field PCI_GI_EXT may contain information compliant with DVD+VR specification Section 3.4.1. In one example, the field PCI_GI_EXT may be implemented containing information in accordance with the present invention for controlling the playback speed of all or a selected portion of a title.

Figures 5, 6, 9:
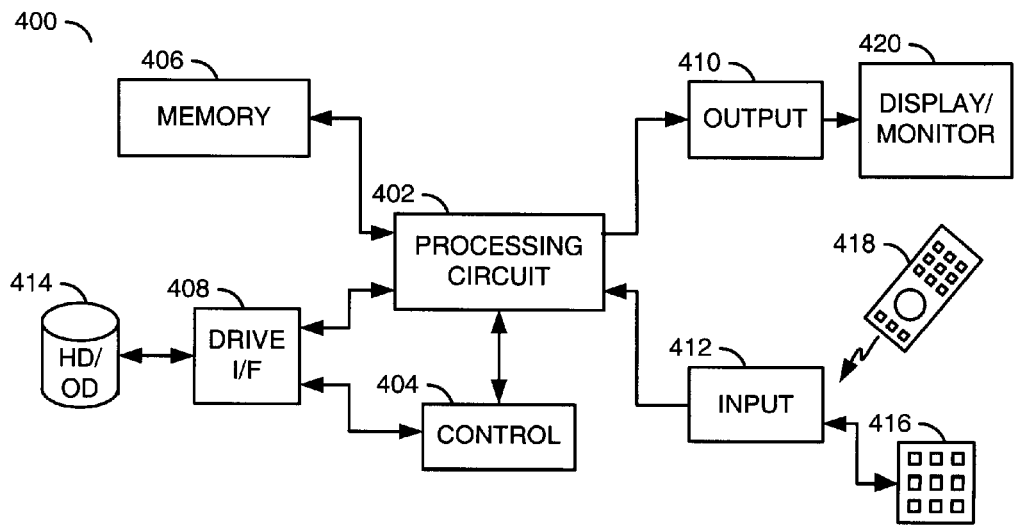
FIG. 5 is a diagram illustrating a presentation control information general information extension (PCI_GI_EXT) portion of FIG. 4 implemented in accordance with an embodiment of the present invention.
FIG. 6 is a diagram illustrating a video speed attribute implemented in accordance with an embodiment of the present invention.
FIG. 9 is a block diagram illustrating a digital storage device capable of providing advanced editing operations in accordance with the present invention.

Referring to FIG. 5, a diagram is shown illustrating a presentation control information general information extension (PCI_GI_EXT) portion of FIG. 4 implemented in accordance with an embodiment of the present invention. In one example, the PCI_GI_EXT portion of the PCI general information may comprise a first reserved field, a field containing PCI_GI extension information (e.g., PCI_GI_XI), a field containing information about one or more real-time video attributes (e.g., RT_ATR_1), a field containing information about one or more real-time audio attributes (e.g., RT_ATR_2), a field containing playback speed attributes (e.g., RT_ATR_3) and a second reserved field. In one example, the real-time video attributes may comprise information concerning aspect ratio, subtitling mode, source picture letterboxing and film camera mode. In one example, the real-time audio attributes may comprise information concerning surround sound type. However, other types of information may be implemented accordingly to meet the design criteria of a particular implementation.

Referring to FIG. 6, a diagram is shown illustrating a video speed attribute field implemented in accordance with an embodiment of the present invention. In one example, the field RT_ATR_3 of FIG. 5 may be implemented as a video speed attribute field in accordance with an embodiment of the present invention. In one example, the field RT_ATR_3 may comprise two bytes containing information for controlling a play back speed of all, or a portion, of a title. In one example, a first byte may be configured to control a fast motion playback mode and a second byte may be configured to control a slow motion playback mode. In one example, the fast motion playback mode may allow playback of a title at a speed ranging from 1× (e.g., normal forward speed) up to 32×. In one example, the slow motion playback mode may allow playback of a title at a speed ranging from 1× (e.g., normal forward speed) down to 1/32×. In one example, bits may be reserved for future expansion. In one example, the slow and fast modes may provide speed increments of 1/2× and 2×, respectively. However, other ranges and increments may be implemented accordingly to meet the design criteria of a particular implementation.

Referring to FIGS. 7(A-D), diagrams are shown illustrating an editing feature in accordance with the present invention. In one example, a recording/editing apparatus (or device) in accordance with an embodiment of the present invention may implement an edit button (e.g., on a front face of the apparatus, on a remote control, in a menu displayed by the apparatus, etc.). When the edit button is pressed, an editing screen 200 (FIG. 7A) may be displayed. In one example, the editing screen may include the word EDIT as a title and present a number of buttons 202a-202n showing some or all of the editing features (e.g., SHOW, HIDE, DELETE, NORMAL, FAST, SLOW, etc.) available on the recording/editing apparatus. In one example, a button 202d may represent a fast motion function and the button 202n may represent slow motion function.

In one embodiment, when one of the buttons 202a-202n is selected, the button may be highlighted and the user instructed to select (mark) a start picture (or position) 210 and an end picture (or position) 220 of the portion to which the selected function should be applied (e.g., FIG. 7B). In another embodiment, the user may be instructed to mark the start and end of the portion and then select the function to be applied to the marked portion. In either embodiment, marking may be accomplished using any appropriate method that provides a reliable and accurate indication of the location where the portion begins and ends. In one example, marking may be accomplished by storing a disc sector number or an address identifying the beginning of a VOBU 144. However, other methods of marking may be implemented accordingly to meet the design criteria of a particular implementation. In one example, trick mode may be used to allow the user to scan the title for marking the start and end points.

In one example, when the fast motion button 202d or the slow motion button 202n is selected, another screen 240 (FIG. 7C) or 260 (FIG. 7D), respectively, may be displayed with an appropriate title. The screens 240 and 260 may include a number of buttons 242a-242n and 262a-262n, respectively, representing a number of fast or slow motion speeds supported (available). Upon selection of one of the buttons by the user, PCI data of the title may be programmed (or modified) to implement the appropriate playback speed.

Figure 8:
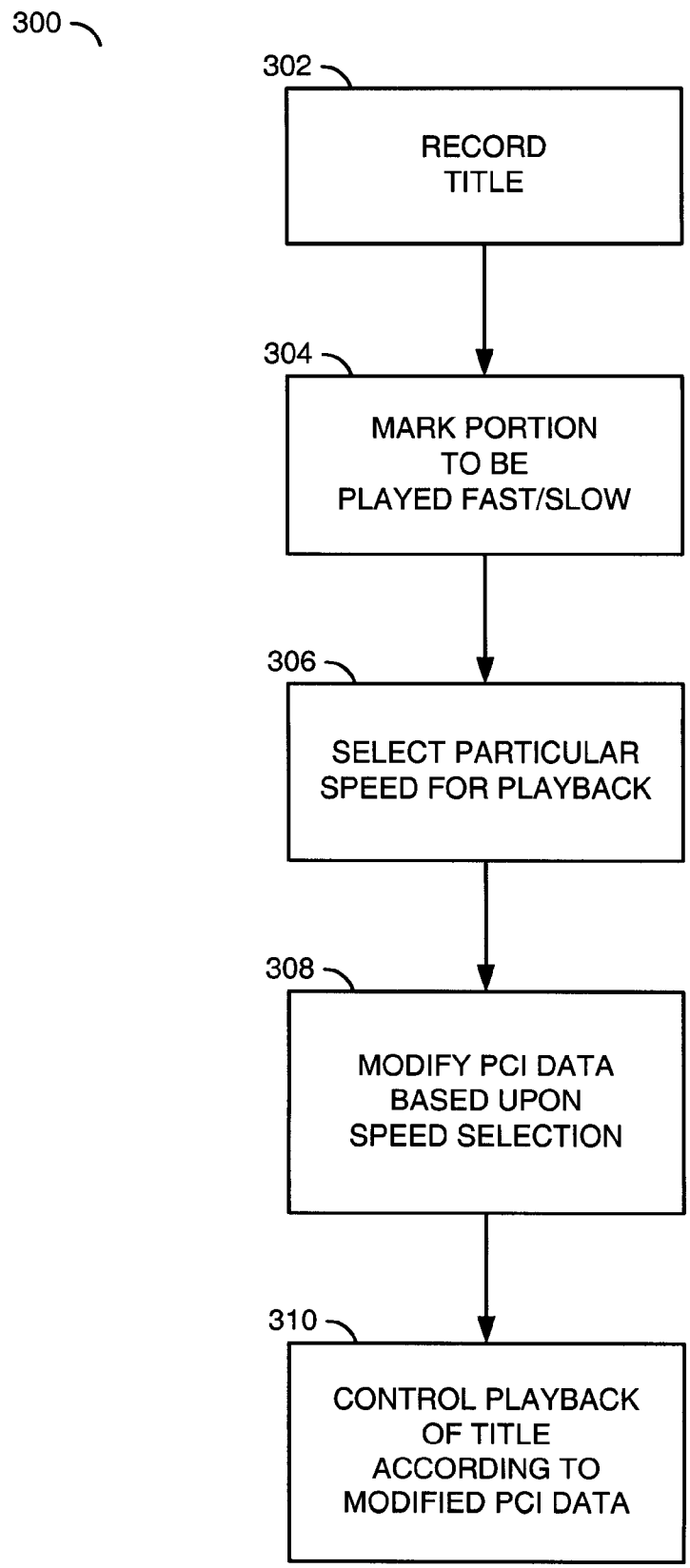
FIG. 8 is a flow diagram illustrating a title editing process in accordance with an embodiment of the present invention.

Referring to FIG. 8, a flow diagram is shown illustrating a title editing process 300 in accordance with an embodiment of the present invention. In one example, the process may comprise a step (or process) 302, a step (or process) 304, a step (or process) 306, a step (or process) 308 and a step (or process) 310. The step 302 may comprise a title recording step. The step 304 may comprise a portion marking step. The step 306 may comprise a playback speed selection step. The step 308 may comprise a control data modification step. The step 310 may comprise a playback speed control step.

A user may begin the process 300 by performing the process 302 of recording a title (e.g., using a digital video camera to record a vacation, home movie, etc.). As used herein, the term title refers to material (e.g., video, movies, audio, etc.) stored on an optical disc. In one example, the title may be recorded using a default setting of FWD×1. When the title has been recorded, the process 300 may enter a title editing phase. The title editing phase of the process 300 may begin by executing the process 304. In the process 304, the user may mark a start and an end point defining a portion of the title to be played back at a speed other than the default of FWD×1. Similarly, the user may mark a portion to be returned to the default setting of FWD×1. When the portion has been marked, the process 300 may move to the process 306.

In the process 306, the user may select a particular playback speed to be applied to the marked portion. When the user has selected the playback speed, the process 300 may move to the process 308. In the process 308, the process 300 may modify PCI data for the marked portion of the title based upon the playback speed selected. For example, a playback speed attribute in the PCI data may be set to a value corresponding to the selected playback speed. When the PCI data has been modified, the process 300 may finish in the process 310. In the process 310, when the title is played back, the playback speed of the title is controlled based upon the modified PCI data.

Referring to FIG. 9, a block diagram is shown illustrating a digital storage device 400 in accordance with an embodiment of the present invention. The device 400 may be implemented, for example, as a digital video recorder (DVR), personal video recorder (PVR), an optical disc recorder/player (e.g., DVD, DVD-RAM, DVD-ROM, DVD-R, a DVD-RW disc, a DVD+R disc, a DVD+RW disc, a DVD-VR disc and a DVD+VR), etcetera. The device 400 may comprise a block (or circuit) 402, a block (or circuit) 404, a block (or circuit) 406, a block (or circuit) 408, a block (or circuit) 410 and a block (or circuit) 412.

The block 402 may be implemented, in one example, as a processing circuit. The block 404 may be implemented, in one example, as a control circuit. The block The block 406 may be implemented, in one example, as a memory circuit. The block 408 may be implemented, in one example, as a drive interface (I/F) circuit. The block 410 may be implemented, in one example, as an output circuit. The block 412 may be implemented, in one example, as an input circuit. The blocks 402-412 may be implemented using conventional circuits and techniques modified in accordance with the teachings disclosed herein, as would be apparent to skilled artisans in the relevant art(s).

The block 402 may have a first input/output interface with the block 404, a second input/output interface with the block 406, a third input/output interface with the block 408, an output interface coupled to the block 410 and an input interface coupled to the block 412. The block 404 may have a second input/output interface coupled to a second input/output interface of the block 408. The block 408 may be configured to interface the device 400 with a drive mechanism 414. In one example, the drive 414 may be implemented as a hard drive device. In another example, the drive 414 may be implemented as an optical drive mechanism.

The block 412 may be configured to receive input from a keyboard (or keypad) 416 and/or a remote control 418. In one example, the remote control 418 may communicate with the block 412 via an infra-red (IR) link. The block 412 may be configured as an input portion of a user interface to receive, in one example, editing commands in accordance with the present invention. The block 410 may be configured to present a signal to a display/monitor 420. The signal presented to the display/monitor 420 may comprise material for presentation on the display/monitor 420 (e.g., pictures, video, audio, graphics, menus, a user interface, etc.).

The device 400 may provide a user interface configured to (i) present one or more editing options to a user, (ii) receive information defining a portion of a title to be edited for slow or fast motion playback and (iii) receive a user editing command directed to slow or fast motion playback of the portion. The block 402 may be configured to modify at least one address of presentation control information (PCI) for the title based upon the user editing command received via the user interface. The block 404 may be configured to playback of the title in accordance with the modified PCI to carry out the user editing command. The title may be stored in either the memory 406 or the drive mechanism 414. The block 410 may be configured to generate a signal configured to cause the one or more editing options to be displayed on the display/monitor 420. The block 412 may be configured to receive one or more signals (e.g., user editing commands, etc.) from the keypad 416 and/or the remote control device 418.

The device 400 may be further configured to receive information from the user defining the portion for slow or fast motion playback. In one example, the portion may be defined by the user providing a start address and an end address of the portion. For example, the user may input a start address corresponding to a first location on the storage medium and an end address corresponding to a second location on the storage medium. In another example, the device 400 may allow the user to define the portion of the title to be edited for slow or fast motion by providing a start address for a video object unit (VOBU). In still another example, the device 400 may allow the user to define the portion of the title to be edited for slow or fast motion by selecting a start frame and an end frame of the portion. In yet another example, the device 400 may be configured to use trick mode to allow the user to scan the title for marking a start point and an end point defining the portion for slow or fast motion playback.

The device 400 may be configured to modify program control information/presentation control information (PCI) for the title based upon editing commands received from the user. In one example, the device 400 may modify at least one address of PCI general information (PCI_GI). In another example, the device 400 may modify at least one address of a presentation control information general information extension (PCI_GI_EXT). For example, the device 400 may be configured to modify at least one real-time attribute of the presentation control information general information extension (PCI_GI_EXT), where the at least one real-time attribute controls playback speed.

As would be apparent to those skilled in the relevant art(s), the signals illustrated in FIG. 9 represent logical data flows. The logical data flows are generally representative of physical data transferred between the respective blocks by, for example, address, data, and control signals and/or busses. The system represented by the circuit 400 may be implemented in hardware, software or a combination of hardware and software according to the teachings of the present disclosure, as would be apparent to those skilled in the relevant art(s).

As used herein, the term title generally referres to a logical entity that is part of a Video Title Set (VTS). As would be apparent to those skilled in the relevant art(s), a recording generally refers to a physical data storage structure on a storage media. A title generally provides a logical reference to the recording. At a higher abstraction level, a title always refers to a recording and hence the terms may be used interchangeably.

While the invention has been particularly shown and described with reference to the preferred embodiments thereof, it will be understood by those skilled in the art that various changes in form and details may be made without departing from the scope of the invention.

The invention claimed is:

1. A method for editing a title recorded on a non-transitory digital storage medium comprising the steps of:
    defining a portion of said title to be edited for play back in slow or fast motion;
    modifying at least one address of presentation control information (PCI) for said title based upon a user editing command, wherein said at least one address of presentation control information (PCI) comprises real-time playback speed attributes for said title; and
    controlling playback of said title in accordance with the modified real-time playback speed attributes to carry out the user editing command.

2. The method according to claim 1, wherein defining said portion of said title to be edited for slow or fast motion comprises:
    providing a start address of said portion; and
    providing an end address of said portion.

3. The method according to claim 2, wherein said start address corresponds to a first location on said medium and said end address corresponds to a second location on said medium.

4. The method according to claim 1, wherein defining said portion of said title to be edited for slow or fast motion comprises providing a start address for a video object unit (VOBU).

5. The method according to claim 1, wherein defining said portion of said title to be edited for slow or fast motion comprises:
   selecting a start frame of said portion; and
   selecting an end frame of said portion.

6. The method according to claim 1, further comprising:
   presenting a number of slow and fast motion options to the user; and
   receiving said user editing command, wherein said user editing command selects one of the number of slow and fast motion options.

7. The method according to claim 1, wherein said at least one address of presentation control information (PCI) comprising real-time playback speed attributes for said title is part of at least one address of PCI general information (PCI_GI) for said title.

8. The method according to claim 1, wherein said at least one address of presentation control information (PCI) comprising real-time playback speed attributes for said title is part of a presentation control information general information extension (PCI_GI_EXT) for said title and said presentation control information general information extension further comprises at least one address of presentation control information (PCI) comprising information about one or more real-time video attributes and at least one address of presentation control information (PCI) comprising information about one or more real-time audio attributes.

9. The method according to claim 1, wherein said at least one address of presentation control information (PCI) comprising real-time playback speed attributes for said title is part of a presentation control information general information extension (PCI_GI_EXT) for said title, and said real-time playback speed attributes comprise a first attribute configured to control a fast motion playback mode and a second attribute configured to control a slow motion playback mode.

10. An apparatus for editing a title recorded on a digital storage medium comprising:
    means for defining a portion of said title to be edited for slow or fast motion playback;
    means for modifying at least one address of presentation control information (PCI) for said title based upon a user editing command, wherein said at least one address of presentation control information (PCI) comprises real-time playback speed attributes for said title; and
    means for controlling playback of said title in accordance with the modified real-time playback speed attributes to carry out the user editing command.

11. An apparatus for editing a title recorded on a digital storage medium comprising:
    a user interface configured to (i) present one or more editing options to a user, (ii) receive information defining a portion of said title to be edited for slow or fast motion playback and (iii) receive a user editing command directed to slow or fast motion playback of said portion;
    a processing circuit configured to modify at least one address of presentation control information (PCI) for said title based upon said user editing command, wherein said at least one address of presentation control information (PCI) comprises real-time playback speed attributes for said title; and
    a control circuit configured to playback of said title in accordance with the modified real-time playback speed attributes to carry out the user editing command.

12. The apparatus according to claim 11, wherein said user interface comprises:
    an output circuit configured to generate a signal configured to cause said one or more editing options to be displayed on a monitor;
    an input circuit configured to receive one or more signals from a remote control device.

13. The apparatus according to claim 11, further comprising:
    an optical disc drive configured to read and write optical discs.

14. The apparatus according to claim 11, wherein said optical discs comprise digital video discs (DVD).

15. The apparatus according to claim 13, wherein said optical disc drive reads and writes at least one of a DVD disc, a DVD-RAM disc, a DVD-ROM disc, a DVD-R disc, a DVD-RW disc, a DVD+R disc, a DVD+RW disc, a DVD-VR disc and a DVD+VR disc.

16. The apparatus according to claim 11, further comprising a hard drive storing said title.

17. The apparatus according to claim 11, wherein said user interface is further configured to use trick mode to allow the user to scan the title for marking a start point and an end point defining said portion.

18. The apparatus according to claim 11, wherein said at least one address of presentation control information (PCI) comprising real-time playback speed attributes for said title is part of at least one address of PCI general information (PCI_GI) for said title.

19. The apparatus according to claim 11, wherein said at least one address of presentation control information (PCI) comprising real-time playback speed attributes for said title is part of a presentation control information general information extension (PCI_GI_EXT) for said title and said presentation control information general information extension further comprises at least one address of presentation control information (PCI) comprising information about one or more real-time video attributes and at least one address of presentation control information (PCI) comprising information about one or more real-time audio attributes.

20. The apparatus according to claim 11, wherein modifying said at least one address of presentation control information (PCI) comprising real-time playback speed attributes for said title is part of a presentation control information general information extension (PCI_GI_EXT) for said title, and said real-time playback speed attributes comprise a first attribute configured to control a fast motion playback mode and a second attribute configured to control a slow motion playback mode.

* * * * *